(12) United States Patent
Wang et al.

(10) Patent No.: US 10,782,519 B2
(45) Date of Patent: Sep. 22, 2020

(54) VIEWING METHOD AFTER CLEANING PIPELINE AND VIEWING APPARATUS THEREOF

(71) Applicant: MUN SIONG ENGINEERING LIMITED, Singapore (SG)

(72) Inventors: Wei-Bin Wang, Kaohsiung (TW); Chien-Yuan Huang, Kaohsiung (TW)

(73) Assignee: MUN SIONG ENGINEERING LIMITED, Singapore (SG)

(*) Notice: Subject to any disclaimer, the term of this patent is extended or adjusted under 35 U.S.C. 154(b) by 0 days.

(21) Appl. No.: 15/735,490

(22) PCT Filed: Jun. 9, 2015

(86) PCT No.: PCT/CN2015/081101
§ 371 (c)(1),
(2) Date: Dec. 11, 2017

(87) PCT Pub. No.: WO2016/197333
PCT Pub. Date: Dec. 15, 2016

(65) Prior Publication Data
US 2018/0164575 A1    Jun. 14, 2018

(51) Int. Cl.
*G02B 23/24* (2006.01)
*H04N 7/10* (2006.01)
(Continued)

(52) U.S. Cl.
CPC .......... *G02B 23/2484* (2013.01); *G01N 21/94* (2013.01); *G01N 21/954* (2013.01);
(Continued)

(58) Field of Classification Search
CPC ... B08B 9/0495; B08B 9/0551; B08B 9/0433; B08B 9/049; B08B 9/057; B08B 9/0321;
(Continued)

(56) References Cited

U.S. PATENT DOCUMENTS 3,821,759 A * 6/1974 Vooght ................. G03B 17/08
                                                      396/27
5,604,532 A * 2/1997 Tillmanns ............ G01N 21/954
                                                      348/83
(Continued)

FOREIGN PATENT DOCUMENTS

CN          104307820 A    1/2015
EP          2865457 A1     4/2015
(Continued)

OTHER PUBLICATIONS

International Search Report for Application No. PCT/CN2015/081101, dated Mar. 1, 2016 w/ English Translation.

*Primary Examiner* — Hung Q Dang
(74) *Attorney, Agent, or Firm* — Nixon Peabody LLP; Thomas P. Pavelko

(57) ABSTRACT

A viewing method and apparatus are provided for inspecting a cleaned pipeline. The method comprises providing the viewing apparatus of a cleaned pipeline and pushing the viewing apparatus to an outlet end of the pipeline. During traverse of the pipeline a camera captures pictures of the interior of the pipeline and stores the pictures on an onboard memory. The captured pictures can be viewed on a screen to show the interior of the pipeline to provide a reference for cleaning, replacement or repair of the pipeline.

10 Claims, 10 Drawing Sheets

(51) Int. Cl.
*H04N 5/225* (2006.01)
*G06T 7/00* (2017.01)
*G01N 21/94* (2006.01)
*G01N 21/954* (2006.01)
*H04N 7/18* (2006.01)

(52) U.S. Cl.
CPC ......... *G06T 7/0004* (2013.01); *H04N 5/2252* (2013.01); *H04N 5/2256* (2013.01); *H04N 7/10* (2013.01); *G01N 2021/9544* (2013.01); *G01N 2201/022* (2013.01); *G01N 2201/062* (2013.01); *G06T 2207/30108* (2013.01); *H04N 7/183* (2013.01); *H04N 2005/2255* (2013.01)

(58) Field of Classification Search
CPC ... B08B 9/055; B08B 2209/045; B08B 9/035; B08B 9/0557; B08B 9/032; B08B 9/053; B08B 9/0436; B08B 9/027; B08B 9/00; F17D 5/00; G03B 37/005; G03B 17/08; F16L 55/28; F16L 55/46; F16L 55/18; G01N 21/954; E03F 7/12; E03F 9/00; Y10T 137/4259; Y10T 29/4922; G01M 3/2815; F21V 23/002; F21V 29/74; F21V 29/677; F21V 29/02; F21V 29/673; F21V 29/763; H02G 15/013; H02G 15/18; H02G 9/10; H02G 15/113; H02G 3/088; H02G 3/22; H02G 15/117; H01R 4/70; H01R 13/52; B29C 47/0023; B29C 47/0033; B29C 47/908; D06F 58/14; H01J 9/385; H01J 9/46; B29L 2016/00; H05K 13/00
See application file for complete search history.

(56) References Cited

U.S. PATENT DOCUMENTS

| | | | |
|---|---|---|---|
| 2004/0021858 A1* | 2/2004 | Shima | G01N 21/954 356/241.1 |
| 2011/0048559 A1* | 3/2011 | Stutchbury | B08B 3/02 137/561 R |
| 2014/0247338 A1* | 9/2014 | Kessler | E03F 7/12 348/84 |
| 2014/0333753 A1* | 11/2014 | Chapman | F16C 1/10 348/84 |
| 2015/0229887 A1* | 8/2015 | Kisner | G02B 23/2461 348/84 |

FOREIGN PATENT DOCUMENTS

| | | |
|---|---|---|
| JP | 2000310389 A | 11/2000 |
| JP | 2003343791 A | 12/2003 |
| JP | 2007303872 A | 11/2007 |

* cited by examiner

VIEWING METHOD AFTER CLEANING PIPELINE AND VIEWING APPARATUS THEREOF

CROSS-REFERENCE TO RELATED APPLICATIONS

This application is the United States National Phase of International Application serial number PCT/CN2015/081101, filed Jun. 9, 2015, the entire contents of which are herein incorporated by reference.

TECHNICAL FIELD

The present invention relates to a viewing method after cleaning pipeline and the viewing apparatus thereof, more particularly, to a reference for viewing the interior of a cleaned pipe and cleaning or replacement or maintenance according to it.

BACKGROUND

Generally, for all kind of, for example, pipeline B for transportation or production, in the interior wall of the pipeline B a scaling can be formed after installation and a long term use, which makes the pipeline B have a lower efficiency in transportation and production.

In order to clean the interior wall of the pipeline B and recover a normal transportation of the pipeline B, a tool needs to be used to clean the interior wall of the pipeline B, wherein, a pipeline cleaning head A can be used to clean the interior wall of the pipeline B, referring to FIG. 1. In the surface of the pipeline cleaning head A, multiple erasing knives A1 made of tungsten steel A2 are arranged, and the pipeline cleaning head A is pressed and pushed in the pipeline B by use of a pressure, and the interior wall of the pipeline B is cleaned by all of the erasing knives A1.

However, it is difficult to know or determine whether or not the pipeline B is clean and there exists a damage or corrosion after cleaning. Currently, there are many viewing methods for the cleaned pipeline but not convenient, wherein a method is to view the status of the interior of the pipeline B by a cable viewing apparatus, but it is not easy to be used for view the interior of a longer pipeline B because of a limit of cable length of the viewing apparatus.

Accordingly, the purpose of the invention is to solve the above problem, thus it is easy to know whether or not the pipeline B is clean and there exists a damage or corrosion after cleaning, and to calculate their positions for providing a reference for cleaning, replacement or maintenance.

SUMMARY

Therefore, in order to conveniently view the interior of a pipe the present invention provides a viewing method after cleaning pipeline and viewing apparatus thereof to calculate the positions existing uncleanness, damage or corrosion based on accessed caught images from a memory of a camera arranged in the interior of the front end of the viewing apparatus and a status viewed from a screen, for a reference for re-cleaning, replacement or maintenance to avoid safety accident, improve efficiencies in transportation and production and overcome the problem mentioned in the above background.

The said purpose of the present invention can be achieved by the following technical solutions:

A viewing method after cleaning pipeline for viewing the interior's status of the cleaned pipeline, wherein, comprising the following steps: a. providing a viewing apparatus arranged inside an inlet end of the cleaned pipeline, wherein said viewing apparatus has a flexible cylinder whose outer diameter is more larger than its inner diameter, the front end of which is provided with a camera and a lighting unit providing lighting for said camera; b. providing a pressurization apparatus arranged outside inlet end of the cleaned pipeline, said the viewing apparatus being pushed from the inlet end to inside of the pipeline with pushing pressure generated by a pressurization apparatus, and being forced to go ahead from the inlet end of the pipeline to the outlet end of the pipeline, at the same time, the camera views the status of the interior of the pipeline, and the pipeline images are saved or stored in a memory of the camera; c. taking the camera out of the viewing apparatus, reading the caught image in the memory and viewing the interior of the pipeline using a screen; and d. calculating, according to the known total length of the pipeline from the inlet end of the pipeline to the outlet end of the pipeline, and the time displayed on the screen and spent by the viewing apparatus in reaching the outlet end, the average speed of movement of the viewing apparatus can be calculated, and the positions existing uncleanness, damage or corrosion can be calculated by multiplying the average speed by the journey time displayed on the screen, for a reference for re-cleaning, replacement or maintenance.

Furthermore, the camera is a high speed camera.

Furthermore, the pressurization apparatus works in the manner of water pressurization or air pressurization.

Furthermore, the camera has an USB slot and a memory slot for connection with a computer through the USB slot to read and display contents of the caught images on the screen, or to take the memory out of the memory slot and connect the computer through a card reader, or insert the memory to the computer for reading, then, to display the contents of the caught images in the memory on the screen, in order to view the interior of the pipeline, or the camera also provides a radio frequency technology to display the caught image on a cell phone's screen for viewing the interior of the pipeline by use of the cell phone's APP program's cooperation to receive an video.

Furthermore, the viewing apparatus comprises a flexible cylinder having an accommodation space at its one end; a camera in which a memory for accessing a photographed content is provided, arranged inside the accommodation space of the flexible cylinder; and a lighting unit arranged at the same side with the flexible cylinder and the camera for providing lighting for said camera.

Furthermore, the flexible cylinder forms a closed end facing the inlet end of the pipeline after cleaning, and one end of the flexible cylinder, far away from the closed end, forms a pyramid; wherein the camera comprises a lens with an outer screw connection portion, wherein the viewing apparatus also comprises: an accommodation portion positioned inside of the accommodation space of the flexible cylinder and connected together with the closed end, the accommodation portion forming an accommodation room with an opening; a lock fixing portion, its one end having an opening portion connected in a mutual communication with the opening of the accommodation portion and having a first water proof zone and a second water proof zone extended and mounted facing the upper of the opening portion in a regular order, the first water proof having a first circle slot for a first water proof gasket, the inner rim edge of the second water proof zone having a inner screw portion and the bottom end of the second water proof zone providing a second water proof gasket, and peripheral rim of the lock fixing portion having at least one detention slot for connection with the flexible cylinder; a fixing block mounted in the interior of the lock fixing portion of the flexible cylinder and connected in a sleeve joint (or muff coupling) to one end of the camera, comprising a main body arranged in the interior of the lock fixing portion of the flexible cylinder, a sleeve cover arranged in the main body, a transparent protection eyeglass installed in one end of the main body for providing the lens of the camera, two cables respectively electrically connected to the lighting unit of the main body, and a battery electrically connected with the lighting unit and each of the cable, wherein the outer rim of the main body forming a first extrusive sleeve portion connected in the manner of sleeve joint with the sleeve cover and a second extrusive sleeve portion arranged outward facing the bottom rim the first extrusive sleeve portion, and a third extrusive sleeve portion extended at one side of the second extrusive sleeve portion, the outer diameter of which is larger than the second extrusive sleeve portion, in the interior of first extrusive sleeve portion a opening hole being formed, and in the outer rim of the opening hole a declined inner block edge being formed for providing the transparent protection lens a support; in the interior of the declined inner block edge a third water proof gasket is provided for a third water proof zone, while in the inner rim of the main body a first accommodation room for insertion of the camera and a second accommodation room for receiving each of the cables in a sequence being formed by the declined inner block edge facing the third extrusive sleeve portion, and the main body facing the end of first accommodation room having a inner screw connection portion connected by a outer screw with the outer screw connection portion of the camera, the main body having a slot room facing the second accommodation room, the slot room being communicated with the first accommodation room the second accommodation room; the second extrusion sleeve and the third extrusion sleeve having at least two cable holes being communicated with the slot room, respectively, the sleeve cover having a circle extrusion portion connected with the lock fixing portion by sleeve, the outer diameter of which is less than that of the sleeve cover, in the central part of the sleeve cover and the circle extrusion portion a sleeve joint hole being provided for insertion of the first extrusion sleeve portion of the main body, in the outer side of the sleeve joint (muff coupling) hole a circle extrusion block for support of the first extrusion sleeve portion, a first concave portion connected in the manner of sleeve joint with the first extrusion portion of the main body and a second concave portion connected in the manner of sleeve joint by a sleeve structure with the second extrusion portion of the main body being provided, the sleeve cover having two opening holes respectively arranged facing each of the cable holes and correspondent to the first concave portion, the lighting unit being provided between each of the correspondent opening holes and the circle extrusion portion, while the lighting unit being respectively connected to each of the cables, and electrically connected with the battery by entering each of the correspondent cable holes and going out of the slot room; and a cover body covering the flexible cylinder for accommodating the camera and the fixing block in the flexible cylinder, and the cover body comprising a extrusion wall, a contact portion annularly arranged facing the inner rim of the extrusion wall and an extrusion connection portion extended to the inner side of the contact portion, a concave slot for provision of sleeve joint of the lock fixing portion each other being formed in the back of extrusion wall, a fourth water proof gasket being provided in the contact portion, contacted and integrated with the circle extrusion portion of the sleeve cover to form a fourth water proof zone, in the inner side of the extrusion connection portion a sleeve hole is provided for sleeve joint of the fixing block of the main body, and in the outer side of the extrusion portion an outer screw portion is provided for a bilateral screw connection of the inner screw portion of the lock fixing portion.

Furthermore, multiple clutch closing slots are annularly provided in the surface of the extrusion wall of the cover body, each of clutch closing slot is a half circle concave slot, and a tool is provided, one end of which are provided multiple extrusion implant bodies corresponding to each of the clutch closing slots to constitute an implant connection for opening or closing the cover body by the tool.

Furthermore, the lighting unit is a LED lighter, a switch being provided between the lighting unit and the battery, the switch respectively being electrically connected to the lighting unit and the battery.

Furthermore, the camera is a high speed one, the camera having a switch for operation switch off or switch on of the camera positioned on the outer peripheral rim of the camera, an USB slot positioned on one end of the camera and a memory slot for receiving the memory.

Furthermore, at least one passageway is provided in a longitudinal direction of the periphery of the flexible cylinder during the viewing apparatus being pushed by an air pressure, having a decompression valve.

Compared with common structures, the viewing method after cleaning pipeline and the viewing apparatus thereof provided by the present invention possess the following advantages:

The present invention can help the operators, by using the viewing method and the viewing apparatus arranged in the pipeline, in saving caught images from a memory of a camera arranged in the interior of the front end of the viewing apparatus and access the caught images in the memory to calculate the positions existing uncleanness, damage or corrosion according to the status viewed from a screen, for a reference for re-cleaning, replacement or maintenance to avoid safety accident, further improve efficiencies in transportation and production.

BRIEF ON FIGURES

FIG. 5-1 is a perspective combination diagram of the viewing apparatus of the present invention.

FIG. 5-2 is a cross section view at A-A.

Figure 1:
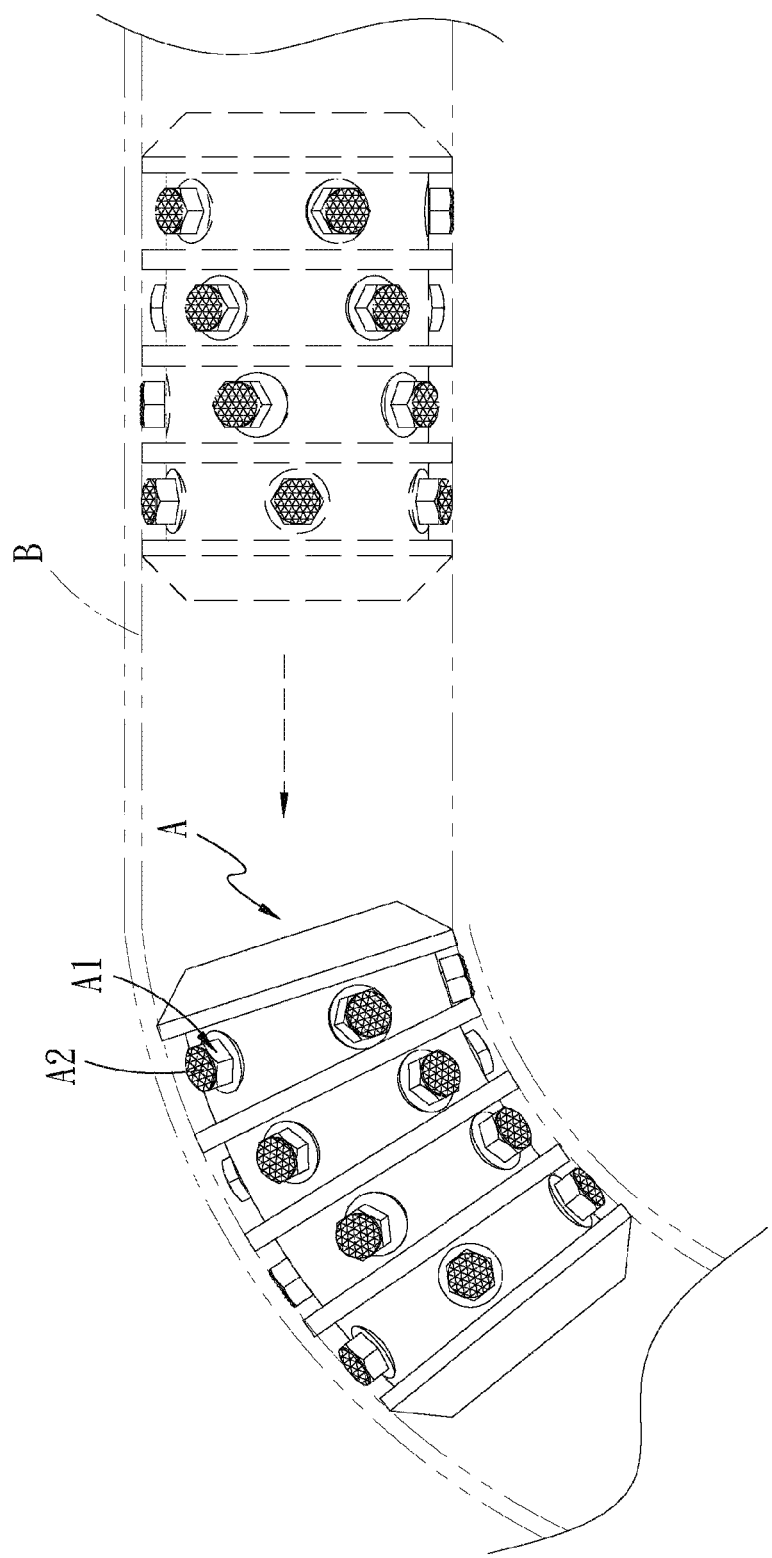
FIG. 1 is diagram demonstrating cleaning the interior wall by use of a common pipeline cleaning head.
Figure 2:
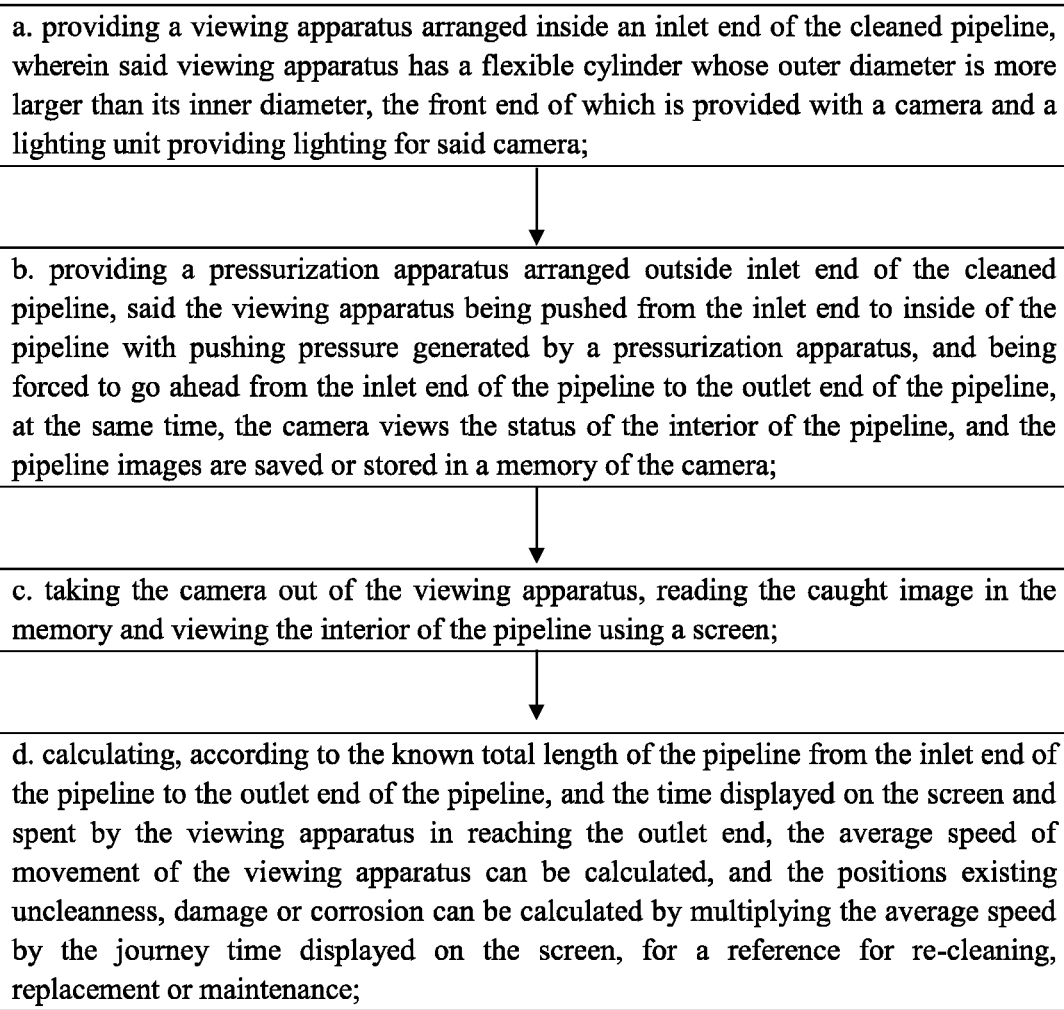
FIG. 2 is a flow chart showing steps of the present invention's method.

| [Brief on reference numbers in the FIGS.] | |
|---|---|
| (Commonly used) | |
| Pipeline cleaning head A | Erasing knife A1 |
| Tungsten steel A2 | Pipeline B |
| (Present invention) | |
| Pipeline 1 | Inlet end 11 |
| Outlet end 12 | Elbow 12 |
| Pressurization apparatus 2 | Pushing pressure 3 |
| Viewing apparatus 4 | Flexible cylinder 5 |
| Accommodation space 50 | Closed end 51 |
| Passageway 511 | Decompression valve 512 |
| Accommodation portion 52 | Opening 520 |
| Accommodation room 521 | Lock fixing portion 53 |
| Opening portion 531 | First water proof zone 532 |
| Second water proof zone 533 | First circle slot 534 |
| First water proof gasket 535 | Inner screw portion 536 |
| Second water proof gasket 537 | Detention slot 538 |
| Camera 6 | Lens 61 |
| Outer screw connection portion 62 | Switch 63 |
| USA slot 64 | Memory slot 65 |
| Memory 66 | Screen 67 |
| Computer 68 | Cell phone 69 |
| Lighting unit 7 | Fixing block 70 |
| Main body 71 | Opening hole 710 |
| First extrusion sleeve portion 711 | Second extrusion sleeve portion 712 |
| Second extrusion sleeve portion 713 | Third waterproof gasket 714 |
| Declined inner block edge 715 | First accommodation room 716 |
| Second accommodation room 717 | Inner screw connection portion 718 |
| Slot room 719 | Cable hole 7191 |
| Sleeve cover 72 | Circle extrusion portion 720 |
| Sleeve joint hole 7200 | Circle extrusion block 721 |
| First concave portion 722 | Second concave portion 723 |
| Opening hole 724 | Transparent protection eyeglass 73 |
| Cable 75 | Switch 76 |
| Battery 77 | Cover body 8 |
| Extrusion wall 81 | Clutch closing slot 811 |
| Contact portion 82 | Extrusion connection portion 83 |
| Concave slot 84 | Fourth waterproof gasket 85 |
| Sleeve hole 86 | Outer screw portion 87 |
| Tool 9 | Extrusion implant body 91 |

EMBODIMENT

Figure 3:
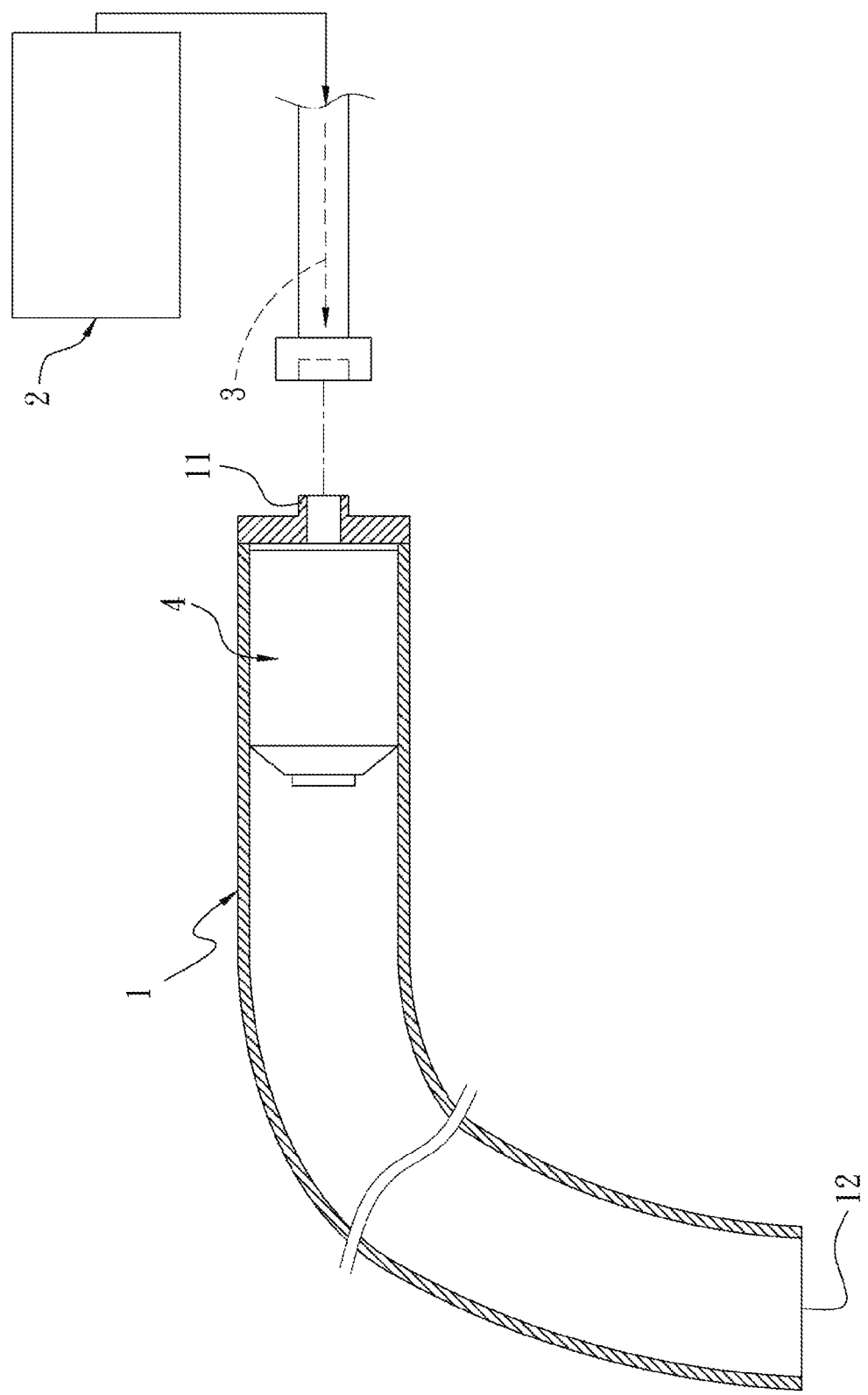
FIG. 3 is a diagram showing the view apparatus and its pressurization apparatus of the present invention.
Figure 4:
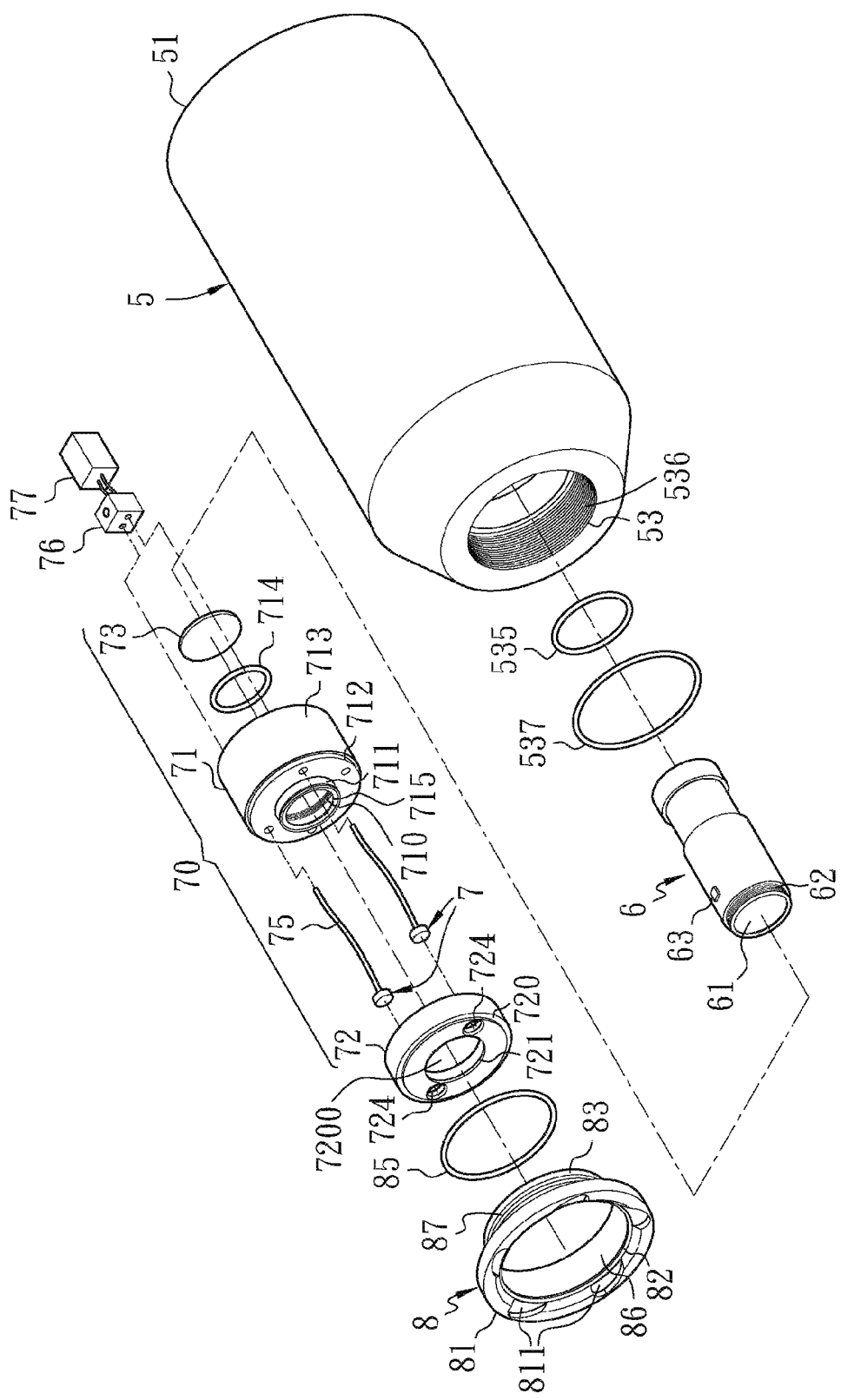
FIG. 4 is a perspective decomposing diagram of the viewing apparatus of the present invention.
Figures 1, 5:
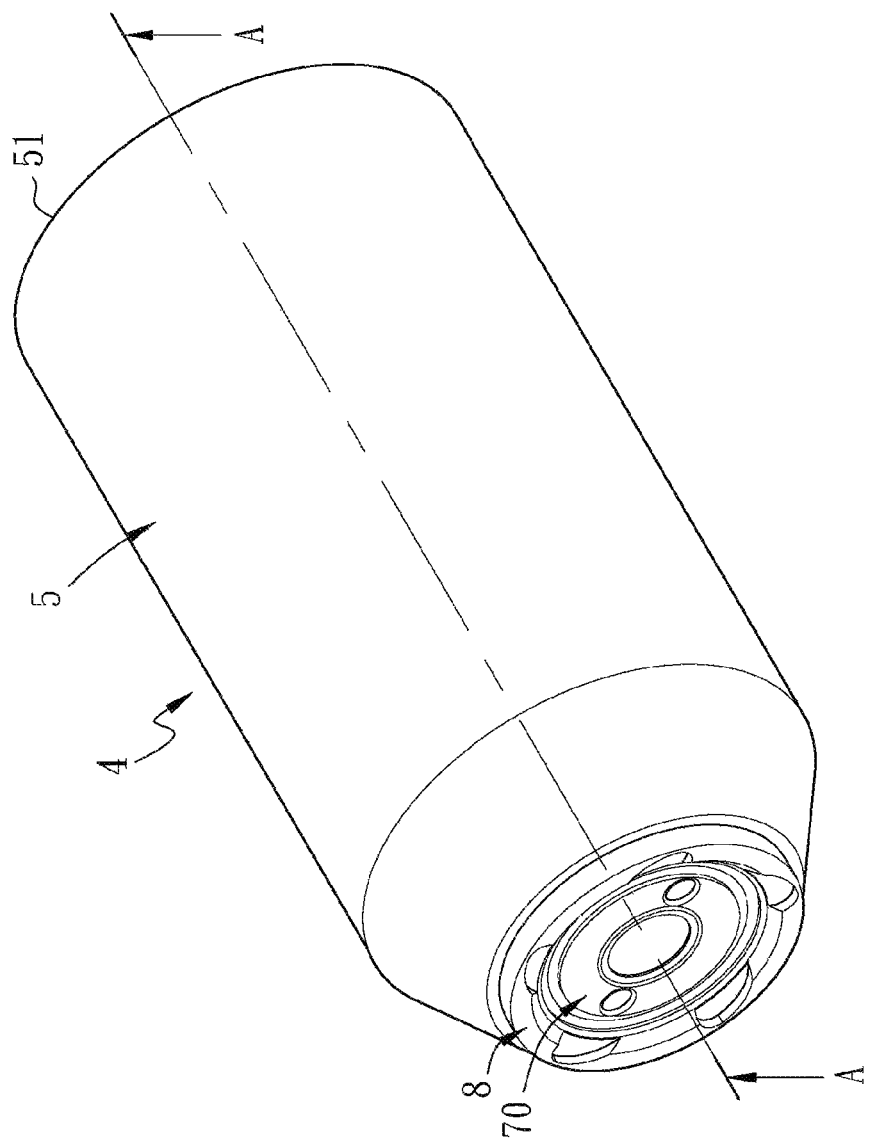
Figures 2, 5:
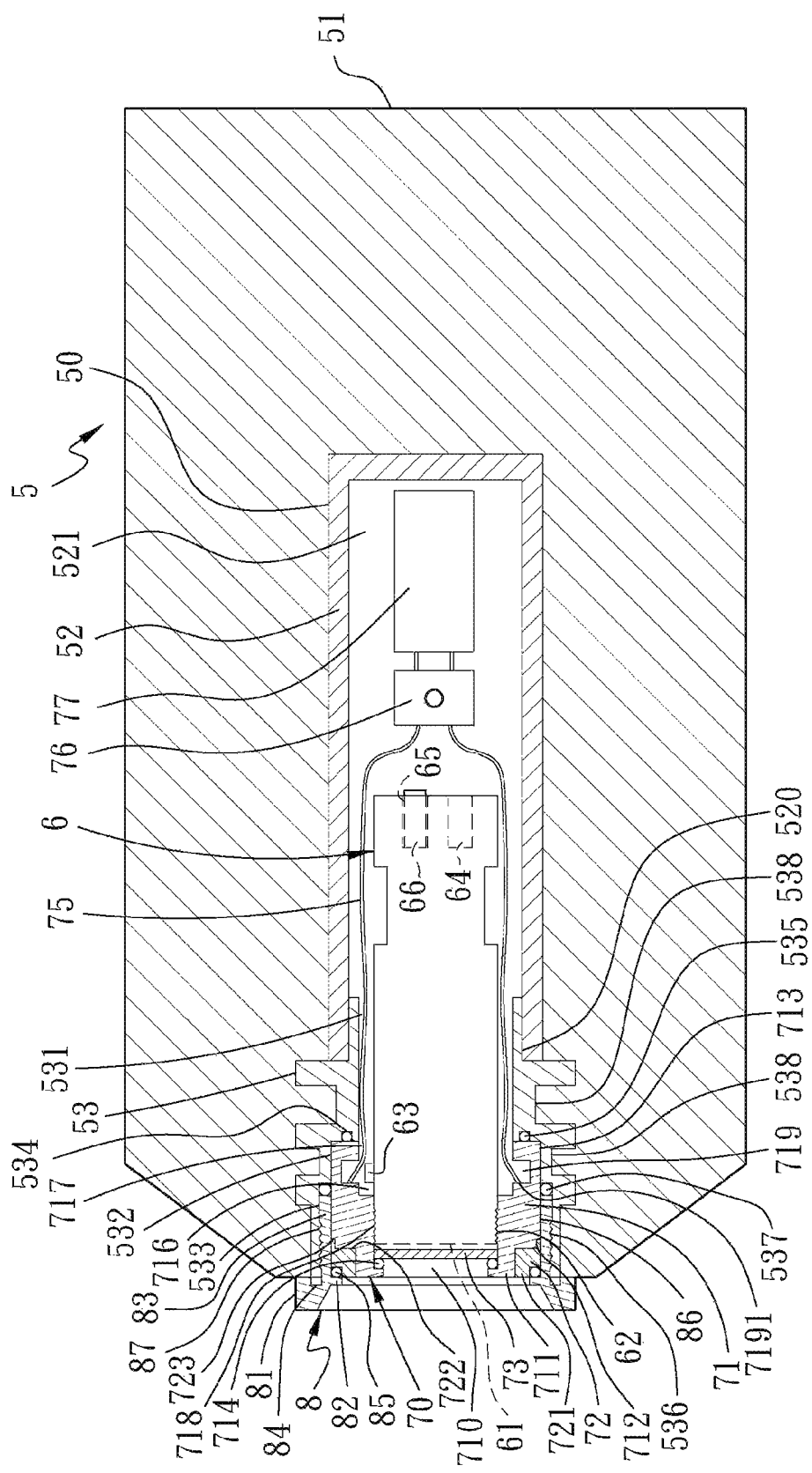

In order to clearly illustrate the embodiments and effects of the present invention, the embodiments of the present invention provides a viewing method after cleaning pipeline to view the interior status of the pipeline 1 after cleaning. The viewing method after cleaning pipeline comprises:

a. providing a viewing apparatus 4 arranged inside an inlet end of the cleaned pipeline 1, said viewing apparatus 4 having a flexible cylinder 5 whose outer diameter is a little larger than its inner diameter of pipeline 1 to form a tight engagement, thus to the resistance for movement of the flexible cylinder 5 is decreased for prevention of decompression, and the front end of the flexible cylinder 5 of the viewing apparatus 4 provided with a camera 6 and a lighting unit 7 for providing lighting for said camera 6 photographing; more specially, the camera 6 is a high speed camera.

b. providing a pressurization apparatus 2 arranged on inlet end 11 of the cleaned pipeline 1, the viewing apparatus 4 being pushed from the inlet end 11 to interior of the pipeline 1 with pushing pressure 3 (see FIG. 3, indicated by arrow) generated by the pressurization apparatus 2, and being forced to go ahead from the inlet end 11 of the pipeline 1 to the outlet end 12 of the pipeline 1, at the same time, the camera 6 viewing the status of the interior of the pipeline, and the pipeline image being saved or stored in a memory 66 of the camera 6; more specifically, the pressurization apparatus 2 works in the manner of water or air pressurization.

c. again, taking the camera 6 out of the viewing apparatus 4, reading the caught images in the memory 66 and viewing the interior of the pipeline on a screen 67;

d. according to the known total length of the pipeline 1 from the inlet end 11 of the pipeline 1 to the outlet end 12 of the pipeline 1, and the time displayed on the screen 67 and spent by the viewing apparatus 4 in reaching the outlet end 12 of pipeline 1, calculating the average speed of movement of the viewing apparatus 4, and the positions existing uncleanness, damage or corrosion by multiplying the average speed by the journey time displayed on the screen 67, for a reference for re-cleaning, replacement or maintenance.

Figure 7:
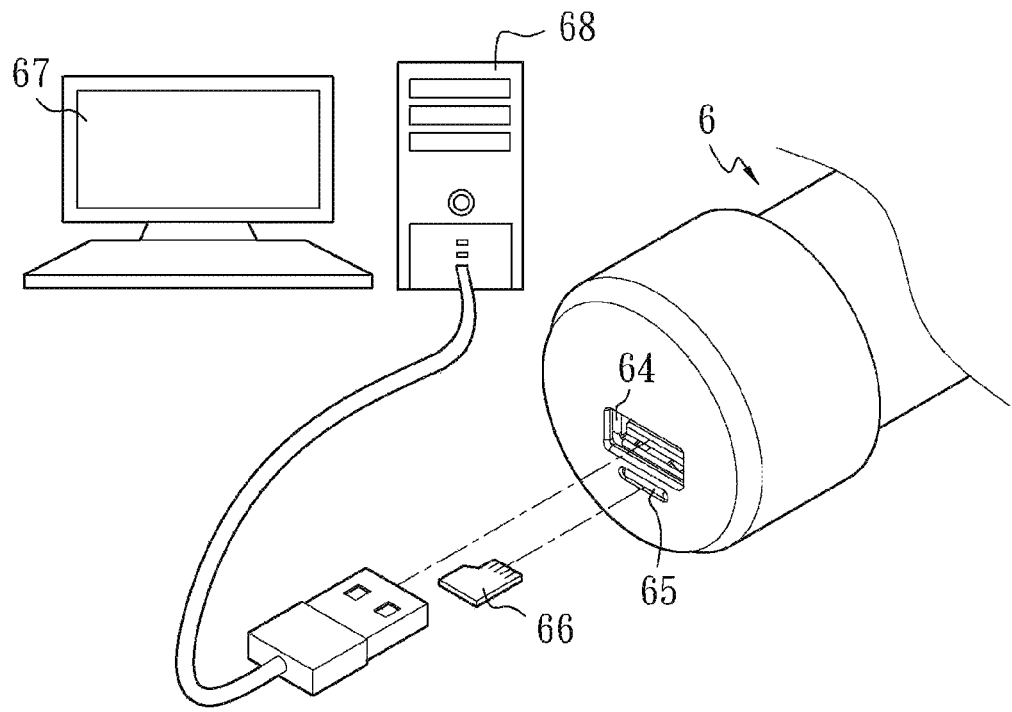
FIG. 7 is a diagram showing transmission between a camera and a computer of the present invention.

More specifically, the viewing apparatus 4 can be opened by use of tool 9. Referring to FIG. 7, the camera 6 has USB slot 64 and memory slot 65 for connection with a computer 68 through the USB slot 64 to read and display contents of caught images on the screen 67, or to take the memory 66 out of the memory slot 65 and connect the computer 68 through a card reader, or insert the memory 66 taken out to the computer 68 for reading, then to display the contents of the caught images in the memory 66 on the screen 67, in order to view the interior of the pipeline, More specifically, referring to FIG. 8, the camera 6 of the viewing apparatus 4 also provides a radio frequency technology to display the caught images on a cell phone 69's screen 67 for viewing the interior of the pipeline by use of the cell phone 69's APP program's cooperation to receive a video.

Referring to FIGS. 3, 4, 5-1 and 5-2 a preferred embodiment of the viewing apparatus 4 of the present invention is shown. The viewing apparatus 4 to view the interior of the cleaned pipeline 1, comprises:

A flexible cylinder 5, having an accommodation space 50 at its one end, forms a closed end 51 facing the inlet end 11 of the pipeline 1 after cleaning, and one end of the flexible cylinder 5 far away from the closed end 51 forms a pyramid, and the outer diameter of the flexible cylinder 5 is a little larger than the inner diameter of the pipeline 1 to form a tight coupling between the flexible cylinder 5 and the inner wall of the pipeline 1 to reduce a resistance for movement, and to prevent a decompression generated by the pressurization apparatus 2 working in the manner of water or air pressurization, thus to provide a pushing pressure 3 from the inlet end 11 of the pipeline 1 to interior of the pipeline, to push the viewing apparatus 4 to move from the inlet end 11 to the outlet end 12 of the pipeline 1;

A camera 6, arranged inside of the accommodation space 50 of the flexible cylinder 5, and having a memory 66 for accessing photographed or caught contents, more specifically, the camera 6 is a high speed camera, having a lens 61 having an outer screw connection portion 62, a switch 63 arranged in the outer periphery rim of the camera 6 for switch on or off the photographing action of the camera 6, and USD slot 64 far away from one end of lens 61 and memory slot 65 for insertion of memory 66 (meanwhile referring to FIG. 7); and A lighting unit 7 arranged at the same side with the flexible cylinder 5 and the camera 6 for providing a lighting for the camera 6, more specially, the lighting unit 7 is a LED lighter and has two LED lighters.

The viewing apparatus of the present invention also comprises accommodation portion 52 positioned inside of the accommodation space 50 of the flexible cylinder 5 and connected together with the closed end 51, lock fixing portion 53 connected to the accommodation portion 52, lock fixing portion 53, fixing block 70 mounted in the interior of the lock fixing portion 53 of the flexible cylinder 5 and connected in the manner of a sleeve joint to one end of the camera 6, and cover body 8 covering the flexible cylinder 5 for accommodating the camera 6 and the fixing block 70 in the flexible cylinder 5; wherein The accommodation portion 52 forms an accommodation room 521 with an opening 520, and is made of water proof materials. Because the flexible cylinder 5 is made of plastic materials, a water penetration may be happened under a high pressure of water pressurization. Therefore, the accommodation portion 52 made of water proof materials can prevent the penetrated water of the flexible cylinder 5 from entering into interior of the accommodation portion 52.

The lock fixing portion 53 has an opening portion 531 connected in a mutual communication with opening 520 of the accommodation portion 52, and has a first water proof zone 532 and a second water proof zone 532 extended and mounted facing the upper of the opening portion 531 in a regular order. More specifically, the first water proof 532 has a first circle slot 534 for a first water proof gasket 535, and the inner rim edge of the second water proof zone 533 has an inner screw portion 536, bottom end of which provides a second water proof gasket 537. The peripheral rim of the lock fixing portion 53 has at least one detention slot 538 for connection with the flexible cylinder 5.

The fixing block 70 comprises a main body 71 arranged in the interior of the lock fixing portion 53 of the flexible cylinder 5, a sleeve cover 72 arranged in the main body 71 in the manner of sleeve setting, a transparent protection eyeglass 73 installed in one end of the main body 71 for providing a protection for the lens 61 of the camera 6, two cables 75 respectively electrically connected to the lighting unit 7 of the main body 71, a switch 76 accommodated in back end of the accommodation room 521 of the accommodation portion 52 and a battery 77 electrically connected with the switch 76. More specifically, the outer rim of the main body 71 of the fixing block 70 forms a first extrusive sleeve portion 711 connected in the manner of a sleeve joint with or facing the sleeve cover 72 and a second extrusive sleeve portion 712 arranged outward facing the bottom rim of the first extrusive sleeve portion 711, and a third extrusive sleeve portion 713 is extended at one side of the second extrusive sleeve portion 712, the outer diameter of which is larger than the second extrusive sleeve portion 712. In the interior of first extrusive sleeve portion 711 an opening hole 710 is formed, and in the outer rim of the opening hole 710 a declined inner block edge 715 is formed for providing the transparent protection eyeglass 73 with a support. In the interior of the declined inner block edge 715 a third water proof gasket 714 is provided for a third water proof zone, while in the inner rim of the main body 71 a first accommodation room 716 for accommodation of the camera 6 and a second accommodation room 717 for receiving each of the cables 75 in a sequence are formed by the declined inner block edge 715 facing the third extrusive sleeve portion 713, and the main body 71 facing the end of first accommodation room 717 has a inner screw connection portion 718 connected by an outer screw 62 with the outer screw connection portion of the camera 6, and the main body 71 has a slot room 719 facing the second accommodation room 717, the slot room 719 being communicated with the first accommodation room 716 and the second accommodation room 717. The second extrusion sleeve 712 and third extrusion sleeve portion 713 have at least two cable holes 7191 being communicated with the slot room 719. In the present embodiment, the sleeve cover 72 has a circle extrusion portion 720 connected in the manner of sleeve joint with the lock fixing portion 53, the outer diameter of which is less than that of the sleeve cover 72. In the central part of the sleeve cover 72 and the circle extrusion portion 72 a sleeve joint hole 7200 is provided for insertion of the first extrusion sleeve portion 711 of the main body 72, in the outer side of the sleeve joint hole 7200 a circle extrusion block 721 for support of the first extrusion sleeve portion 711, a first concave portion 722 connected in the manner of sleeve joint each other with the first extrusion portion 711 of the main body 71 and a second concave portion 723 connected in the manner of sleeve joint each other with the second extrusion portion 712 of the main body 71 are formed. The sleeve cover 72 has two opening holes 724 respectively arranged facing each of the cable holes 7191 and correspondent to the first concave portion 722. The lighting unit 7 is provided between each of the correspondent opening holes 724 and the circle extrusion portion 720, while the lighting unit 7 is respectively connected to each of the cables 75, and electrically connected with the switch 76, then electrically connected to the battery 77 by entering each of the correspondent cable holes 7191 and going out of the slot room 719. Each cable 75 is conducted by the switch 76 to enable each light of the lighting unit 7 to be bared out of the each corresponding two opening holes 724 for lighting, thus the camera 6 can do photographing in a lighting circumstance.

Cover body 8 comprises an extrusion wall 81 with multiple clutch closing slots 811 annularly provided in the surface of the extrusion wall 81, a contact portion 82 annularly arranged facing the inner rim of the extrusion wall 81 and an extrusion connection portion 83 extended to the inner side of the contact portion 82. In the embodiment of the present application, each of clutch closing slot 811 annularly provided in the surface of the extrusion wall 81 is a half circle concave slot, and a tool 9 is provided, having multiple extrusion implant bodies 91 corresponding to each of the clutch closing slots 811 of the cover body 8 to constitute an implant connection, and a concave slot 84 for provision of sleeve joint of the lock fixing portion 53 each other is formed in the back of extrusion wall 81. A fourth water proof gasket 85 is provided in the contact portion 82, contacted together with the circle extrusion portion 720 of the sleeve cover 72 to form a fourth water proof zone. In the inner side of the extrusion connection portion 83 a sleeve hole 86 is provided for a sleeve setting of the main body 71 of the fixing block 70, and in the outer side of the extrusion portion 83 an outer screw portion 87 is provided for a bilateral screw connection of the inner screw portion 536 of the lock fixing portion 53. The viewing apparatus 4 goes through said water proof zones, and during the process of high pressure pushing by the pushing pressure 3 generated by the pressurization apparatus 2 in the manner of water pressure, the penetrated water of the flexible cylinder 5 from entering into the interior of accommodation room 521 of the accommodation portion 52 can be prevented.

Again referring FIGS. 4, 5-1 and 5-2, according to the assembly structure of the viewing apparatus 4's embodiment, before the camera 6 is positioned in the interior of the accommodation room 521 of the accommodation portion 52, the switch 63 of the camera 6 and switch 76 of the interior of the accommodation portion 52 are first switched on, and the lighting unit 7 is arranged with the flexible cylinder 5 and the camera 6 at the same side, then the cover body 8 is closely covered on the flexible cylinder 5 for the camera 6 and the fixing block 70 to be accommodated in the flexible cylinder 5 to light the camera 6 photographing.

Figure 6:
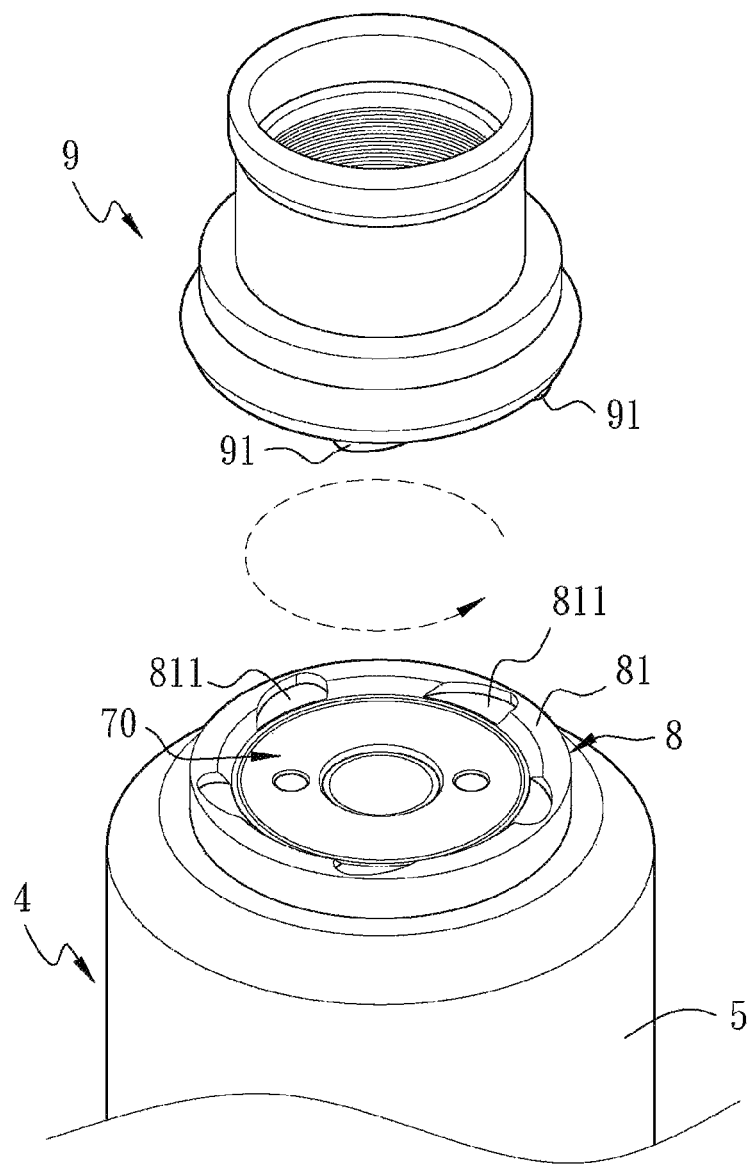
FIG. 6 is a diagram showing opening the viewing apparatus of the present invention.

Referring to FIG. 6, after the interior of the cleaned pipeline 1 is viewed by the viewing apparatus 4, each of extrusion implant body 91 of the tool 9 is engaged with each of corresponding clutch closing slots 811 of the cover body 8, and the tool 9 is turned in switching on or off and open by unscrewing or close by screwing the cover body 8, and the camera 6 is taken out of the interior of the accommodation portion 52 of the flexible cylinder 5 in the viewing apparatus 4.

Figure 8:
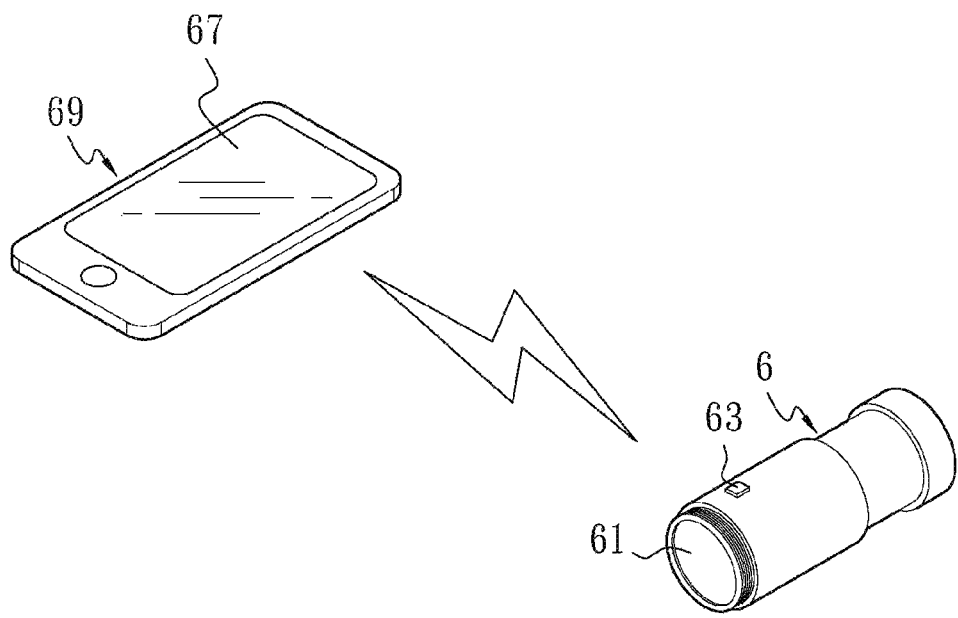
FIG. 8 is a diagram showing transmission between a camera and a cell phone of the present invention.

Referring to FIGS. 7 and 8, the viewing apparatus 4 of the present invention provides a light resource to enable the camera 6 to watch the interior status of the pipeline 1 and catch the images by the lighting unit 7 being bared respectively facing each opening hole 724 of the sleeve cover 72, then the camera 6 is taken out of the viewing apparatus 4 to read the caught images of the memory 66, and the manners for reading are, for example, reading by connection of USB slot 64 of the camera 6 to computer 68 and displaying the contents of the caught images on the screen 67, or removing the memory 66 of the memory slot 65 and connecting a card reader to the computer 68 to read the images, or removing the memory 66 and inserting to computer 68 for reading, then to display the contents of the caught images of the memory 66 on the screen 67, for viewing the status of the interior of the pipeline, or the camera 6 provides a radio frequency technology to display the caught images on a cell phone 69's screen 67 for viewing the interior of the pipeline by use of the cell phone 69's APP program's cooperation to receive a video. According to the known total length of the pipeline 1 from the inlet end 11 of the pipeline 1 to the outlet end 12 of the pipeline 1, and the time displayed on the screen 67 and spent by the viewing apparatus 4 in reaching the outlet end 12 of the pipeline 1, the average speed of movement of the viewing apparatus 4 can be calculated, and the positions existing uncleanness, damage or corrosion can be calculated by multiplying the average speed by the journey time displayed on the screen 67 of computer 68 or cell phone 69, for a reference for re-cleaning, replacement or maintenance.

Figure 9:
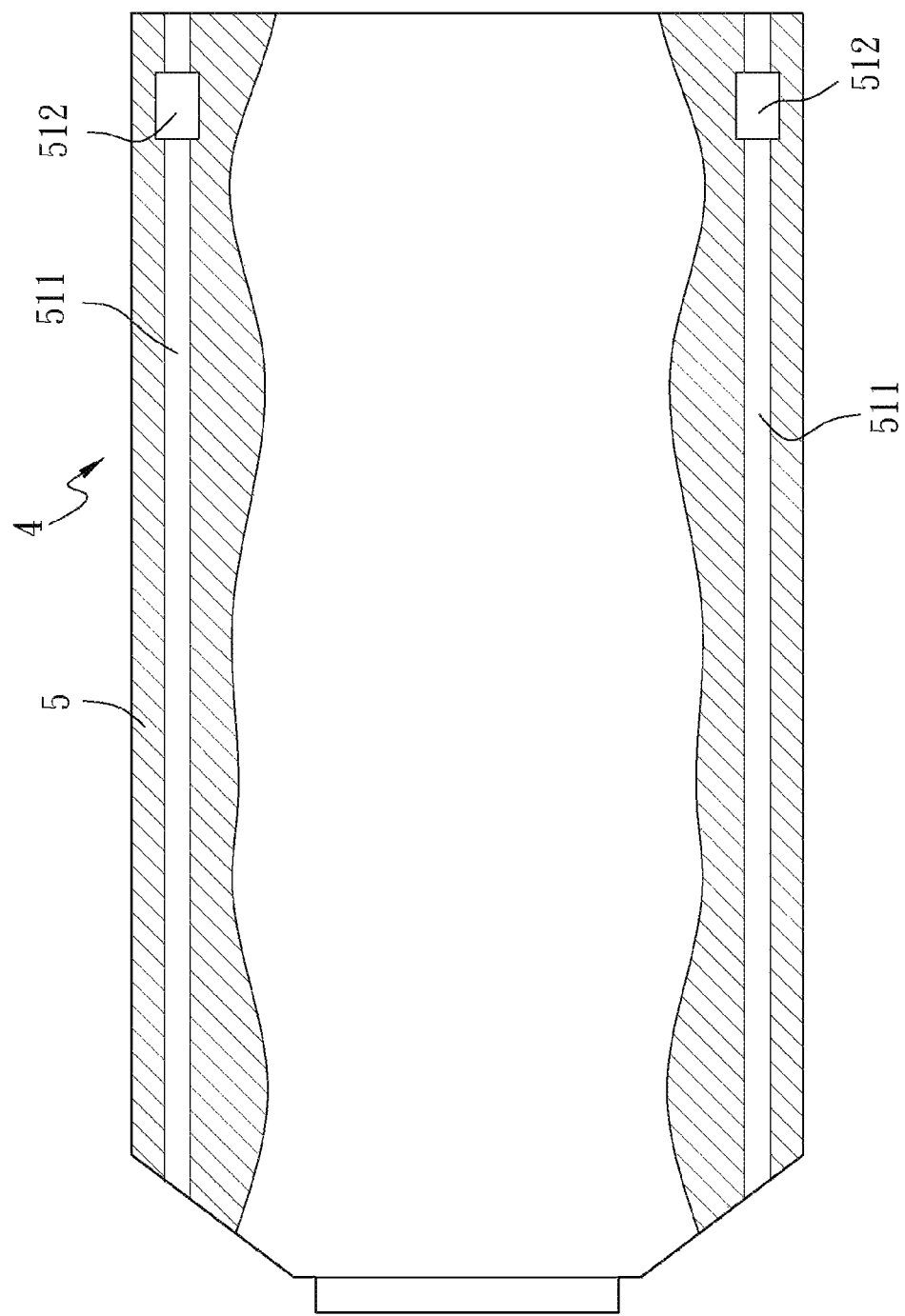
FIG. 9 is a partial diagram showing another embodiment of the flexible cylinder of the viewing apparatus of the present invention.
Figure 10:
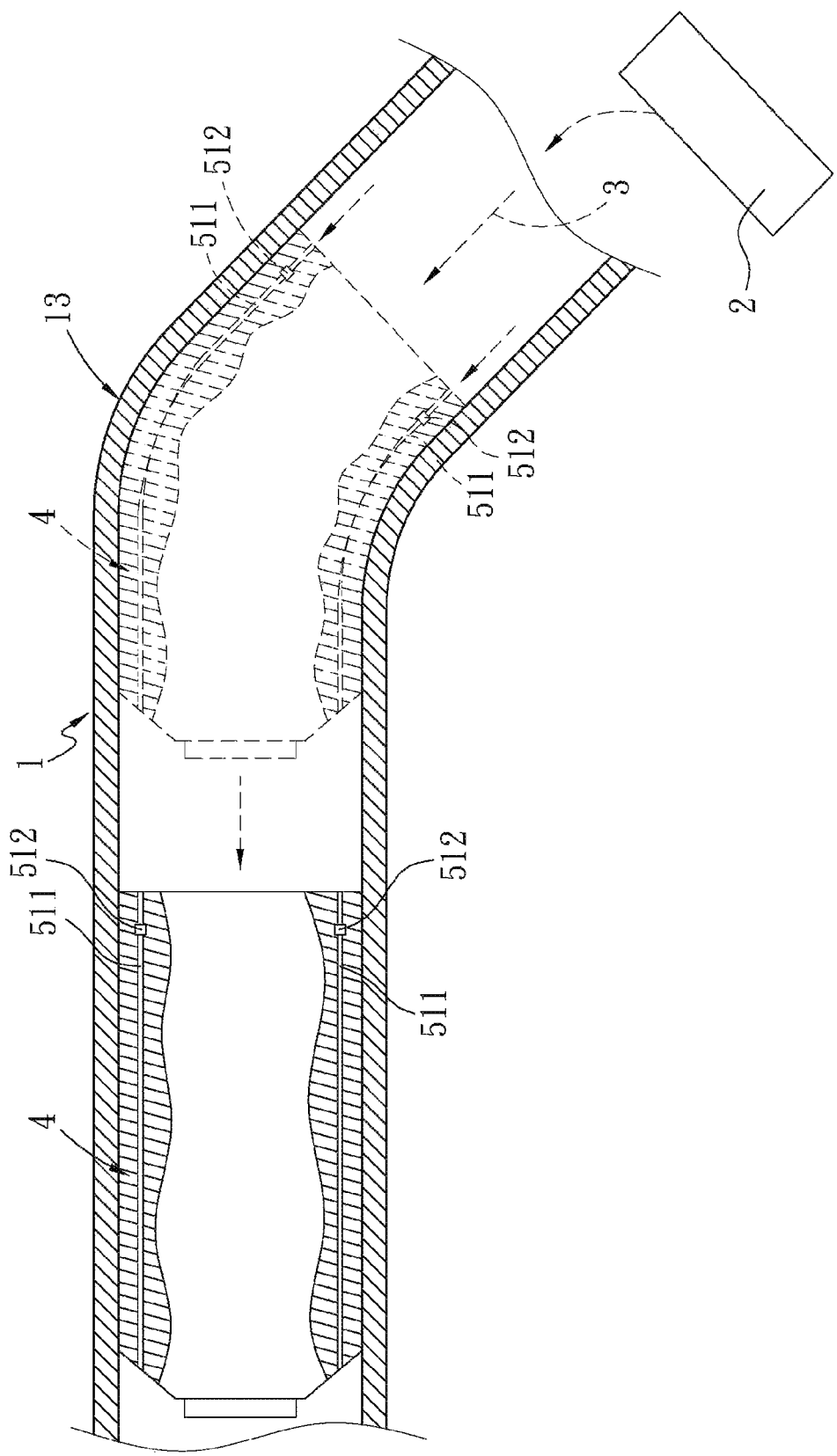
FIG. 10 is a diagram showing the viewing apparatus shown in the FIG. 9 viewing a pipeline with a greater curvature.

Referring to FIGS. 9 and 10 again, during the viewing apparatus 4 is pushed by the pushing pressure 3 of the pressurization apparatus 2 in the pipeline 1 the pressurization apparatus 2 can work by use of water pressure, and pushing pressure 3 is water substance if a more curved elbow in the pipeline 1 is encountered, thus, the pushing pressure of the pressurization apparatus 2 can further push the viewing apparatus 4 stayed in the more curved elbow to go ahead. If the pressurization apparatus 2 works in a manner of air pressure, and the viewing apparatus 4 can no longer go ahead at the more curved elbow of the pipeline 1 and the pressurization apparatus 2 can sense the stay and continuously increase the pressure until the viewing apparatus 5 is pushed going through the more curved elbow and go ahead further. When the pressure of the pressurization apparatus 2 is larger than the fixed pressure originally designated, a decompression needs to be done, and the decompression is achieved by providing at least one passageway 511 at the periphery of the flexible cylinder 5 of the viewing apparatus 4 in a longitudinal direction, and in the passageway 511 a decompression valve 512 is arranged. In the embodiment of the present application 8 passageways 511 and decompression valves 512 are provided, but not limited to 8. Referring to FIGS. 9 and 10, the passageway 511 at the periphery in a longitudinal direction of the flexible cylinder 5 of the viewing apparatus 4 is pushed to the elbow 13 with a more curved bend by the pushing pressure 3 of the pressurization apparatus 2, the passageway 511 at the periphery in a longitudinal direction of the flexible cylinder 5 of the viewing apparatus 4 is pressured to a closed status, as a result, the pushing pressure 3 of the pressurization apparatus 2 cannot go through the passageway 511, the decompression valve 512 in the passageway 511 will be turned on, and the redundant pressure will be released by the decompression valve 512 and the passageway 511, thus, the pushing pressure 3 will be remained stable by the pressurization apparatus 2 to be kept in a pushing status at the original fixed pressure.

The invention claimed is:

1. A viewing method for viewing an interior of a cleaned pipeline of known length and determining the positions within the cleaned pipeline needing re-cleaning, replacement or maintenance, comprising:
   a. providing a viewing apparatus initially arranged inside an inlet end of the cleaned pipeline, wherein said viewing apparatus has a flexible cylinder whose outer diameter is much greater than its inner diameter, the flexible cylinder presenting a closed end facing the inlet of the cleaned pipeline, a front end of the viewing apparatus facing the outlet end of the cleaned pipeline being provided with a camera; and a lighting unit providing lighting for said camera;
   b. providing a fluid pressurization apparatus arranged outside the inlet end of the cleaned pipeline, the viewing apparatus being pushed from the inlet end to an outlet end of the pipeline of known length through the pipeline with a fluid, pushing pressure generated by the pressurization apparatus, and exerted upon the closed end of the viewing apparatus, while, at the same time, the camera views and makes images of the interior of the pipeline as the camera makes the journey from the inlet end to the outlet end of the cleaned pipeline, and the pipeline images of uncleanliness, damage or corrosion are captured, saved or stored in a memory of the camera;
   c. upon reaching the outlet end of the pipeline, reading the captured images in the memory of the camera and viewing the interior of the pipeline using a screen; and
   d. calculating the position in the cleaned pipeline needing re-cleaning, replacement or maintenance, by utilizing the known total length of the pipeline from the inlet end of the pipeline to the outlet end of the pipeline, and a time displayed on the screen and spent by the viewing apparatus in traveling the known total length of the cleaned pipeline from the inlet end to the outlet end of the cleaned pipeline to determine the average speed of movement of the viewing apparatus through the cleaned pipeline, and determining the positions of the interior of the cleaned pipeline exhibiting uncleanliness, damage or corrosion by multiplying the average speed of movement by the journey time displayed on the screen for each location of uncleanliness, damage or corrosion recorded on the captured images, for a reference position for re-cleaning, replacement or maintenance of the cleaned pipeline.

2. The viewing method according to claim 1, wherein the camera is a high speed camera.

3. The viewing method according to claim 1, wherein the pressurization apparatus is one selected from the group consisting of a water pressurization apparatus and an air pressurization apparatus and the pushing pressure comprises at least one selected from the group consisting of water and air.

4. The viewing method according to claim 1, wherein the camera has an USB slot for connection with a computer through the USB slot to read and display contents of the captured images on the screen.

5. The viewing method according to claim 1, wherein the camera has a memory slot to take the memory out of the memory slot and connect the computer through a card reader, or insert the memory to the computer for reading, then, to display the contents of the captured images in the memory on the screen, in order to view the interior of the pipeline.

6. The viewing method according to claim 1, wherein the camera provides a radio frequency technology to display the captured image on a cell phone's screen for viewing the interior of the pipeline by use of the cell phone's APP program's cooperation to receive a video.

7. A viewing apparatus for viewing the interior of a cleaned pipeline, wherein the viewing apparatus comprises:
a flexible cylinder having an accommodation space at one end;
a camera in which a memory for accessing a photographed content is provided, the camera being arranged inside the accommodation space of the flexible cylinder; and
a lighting unit, the lighting unit being arranged at the same side of the flexible cylinder as the camera, for providing lighting for said camera;
wherein the flexible cylinder forms a closed end facing an inlet end of the pipeline, and one end of the flexible cylinder, far away from the closed end, forms a pyramid; wherein the camera comprises a lens with an outer screw connection portion, wherein the viewing apparatus also comprises:
an accommodation portion positioned inside of the accommodation space of the flexible cylinder and connected together with the closed end, the accommodation portion forming an accommodation room with an opening;
a lock fixing portion, its one end having an opening portion connected in a mutual communication with the opening of the accommodation portion and having a first water proof zone and a second water proof zone extended and mounted facing the upper of the opening portion in a regular order, the first water proof zone having a first circle slot for a first water proof gasket, an inner rim edge of the second water proof zone having an inner screw portion and a bottom end of the second water proof zone providing a second water proof gasket, and a peripheral rim of the lock fixing portion having at least one detention slot for connection with the flexible cylinder;
a fixing block mounted in the interior of the lock fixing portion of the flexible cylinder and connected in a sleeve joint to one end of the camera, comprising a main body arranged in the interior of the lock fixing portion of the flexible cylinder, a sleeve cover arranged in the main body, a transparent protection eyeglass installed in one end of the main body for providing the lens of the camera, two cables respectively electrically connected to the lighting unit of the main body, and a battery electrically connected with the lighting unit and each of the cable, wherein the outer rim of the main body forming a first extrusive sleeve portion connected in the manner of sleeve joint with the sleeve cover and a second extrusive sleeve portion arranged outward facing the bottom rim the first extrusive sleeve portion, and a third extrusive sleeve portion extended at one side of the second extrusive sleeve portion, the outer diameter of which is larger than the second extrusive sleeve portion, in the interior of first extrusive sleeve portion a opening hole being formed, and in the outer rim of the opening hole a declined inner block edge being formed for providing the transparent protection lens a support; in the interior of the declined inner block edge a third water proof gasket is provided for a third water proof zone, while in the inner rim of the main body a first accommodation room for insertion of the camera and a second accommodation room for receiving each of the cables in a sequence being formed by the declined inner block edge facing the third extrusive sleeve portion, and the main body facing the end of first accommodation room having a inner screw connection portion connected by a outer screw with the outer screw connection portion of the camera, the main body having a slot room facing the second accommodation room, the slot room being communicated with the first accommodation room the second accommodation room; the second extrusion sleeve and the third extrusion sleeve having at least two cable holes being communicated with the slot room, respectively, the sleeve cover having a circle extrusion portion connected with the lock fixing portion by sleeve, the outer diameter of which is less than that of the sleeve cover, in the central part of the sleeve cover and the circle extrusion portion a sleeve joint hole being provided for insertion of the first extrusion sleeve portion of the main body, in the outer side of the sleeve joint hole a circle extrusion block for support of the first extrusion sleeve portion, a first concave portion connected in the manner of sleeve joint with the first extrusion portion of the main body and a second concave portion connected in the manner of sleeve joint with the second extrusion portion of the main body being provided, the sleeve cover having two opening holes respectively arranged facing each of the cable holes and correspondent to the first concave portion, the lighting unit being provided between each of the correspondent opening holes and the circle extrusion portion, while the lighting unit being respectively connected to each of the cables, and electrically connected with the battery by entering each of the correspondent cable holes and going out of the slot room; and
a cover body covering the flexible cylinder for accommodating the camera and the fixing block in the flexible cylinder, and the cover body comprising a extrusion wall, a contact portion annularly arranged facing the inner rim of the extrusion wall and an extrusion connection portion extended to the inner side of the contact portion, a concave slot for provision of sleeve joint of the lock fixing portion each other being formed in the back of extrusion wall, a fourth water proof gasket being provided in the contact portion, contacted and integrated with the circle extrusion portion of the sleeve cover to form a fourth water proof zone, in the inner side of the extrusion connection portion a sleeve hole is provided for sleeve joint of the fixing block of the main body, and in the outer side of the extrusion portion an outer screw portion is provided for a bilateral screw connection of the inner screw portion of the lock fixing portion.

8. The viewing apparatus according to claim 7, wherein multiple clutch closing slots are annularly provided in the surface of the extrusion wall of the cover body, each of clutch closing slot is a half circle concave slot, and a tool is provided, one end of which are provided multiple extrusion implant bodies corresponding to each of the clutch closing slots to constitute an implant connection for opening or closing the cover body by the tool.

9. The viewing apparatus according to claim 7, wherein the lighting unit is a LED light, a switch being provided between the lighting unit and the battery, the switch respectively being electrically connected to the lighting unit and the battery.

10. A viewing apparatus for viewing the interior of a cleaned pipeline, wherein the viewing apparatus comprises:
 a flexible cylinder comprises an outer cylinder of a first diameter and an inner cylinder of a second diameter, wherein the diameter of the first cylinder is greater than the diameter of the second cylinder, and an accommodation space is provided within the cylinder of second diameter, the accommodation space being at one end of the flexible cylinder, and the flexible cylinder also comprising a closed end at a second end remote from the one end; the inner and outer cylinders being joined at said one end by a surface; said surface defining an opening, the opening being closeable so as to form a waterproof chamber within the accommodation space;
 a camera being arranged inside the waterproof chamber of the accommodation space and a battery and switch for a lighting unit being housed behind the camera; and,
 a lighting unit, the lighting unit being arranged at the same side of the flexible cylinder as the camera, for providing lighting for said camera;
wherein at least one passageway connecting the closed end and said surface is provided in a longitudinal direction of the flexible cylinder during the viewing apparatus being pushed by an air pressure, the at least one passageway having a decompression valve.

* * * * *